US010698072B2

(12) United States Patent
Sen et al.

(10) Patent No.: US 10,698,072 B2
(45) Date of Patent: Jun. 30, 2020

(54) CORRECTING TIME-OF-FLIGHT MEASUREMENTS

(71) Applicant: Hewlett Packard Enterprise Development LP, Houston, TX (US)

(72) Inventors: Souvik Sen, Mountain View, CA (US); Dongho Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 337 days.

(21) Appl. No.: 15/571,658

(22) PCT Filed: May 15, 2015

(86) PCT No.: PCT/US2015/031110
§ 371 (c)(1),
(2) Date: Nov. 3, 2017

(87) PCT Pub. No.: WO2016/186618
PCT Pub. Date: Nov. 24, 2016

(65) Prior Publication Data
US 2018/0143285 A1    May 24, 2018

(51) Int. Cl.
*G01S 5/02*   (2010.01)
*G06Q 10/10*  (2012.01)
(Continued)

(52) U.S. Cl.
CPC .......... *G01S 5/021* (2013.01); *G01S 5/0221* (2013.01); *G01S 5/10* (2013.01); *G06Q 10/10* (2013.01);
(Continued)

(58) Field of Classification Search
CPC . G01S 5/0221; G01S 5/10; G01S 1/02; G01S 3/10; G01S 3/065; G01S 3/08; G01S 3/46; H04B 17/318; G06Q 10/10
(Continued)

(56) References Cited

U.S. PATENT DOCUMENTS 7,433,322 B1   10/2008 Alapuranen
7,860,685 B2   12/2010 Ho
(Continued)

OTHER PUBLICATIONS

Domenico et al., "CAESAR: Carrier Sense-Based Ranging in Off-The-Shelf 802.11 Wireless LAN," Proceedings of the Seventh Conference on emerging Networking Experiments and Technologies, ACM, Dec. 6-9, 2011, 12 pages.
(Continued)

*Primary Examiner* — Harry K Liu
(74) *Attorney, Agent, or Firm* — Hewlett Packard Enterprise Patent Department (57) ABSTRACT

In an example, a method for correcting time-of-flight measurements includes receiving a plurality of time-of-flight measurements and determining whether the time-of-flight measurements relate to a strong signal client, a weak signal client, or a preferred signal client. If the time-of-flight measurements relate to a strong signal client or a weak signal client, the method determines whether the time-of-flight measurements constitute two distinct distributions. If the time-of-flight measurements constitute two distinct distributions, a mean value for each distribution is determined. If the mean values differ by a predetermined time delay attributable to automatic gain control processing, the time-of-flight measurements corresponding to the distribution having the lower mean value are used. If the mean values differ by less than the predetermined time delay attributable to automatic gain control processing, the time-of-flight measurements corresponding to both distributions are used.

15 Claims, 4 Drawing Sheets

(51) Int. Cl.
  *H04B 17/318* (2015.01)
  *G01S 5/10* (2006.01)
  *G06Q 50/30* (2012.01)
  *H04W 52/52* (2009.01)
  *H04W 88/08* (2009.01)

(52) U.S. Cl.
  CPC .......... *H04B 17/318* (2015.01); *G06Q 50/30* (2013.01); *H04W 52/52* (2013.01); *H04W 88/08* (2013.01)

(58) Field of Classification Search
  USPC ........................................................ 342/420
  See application file for complete search history.

(56) References Cited

U.S. PATENT DOCUMENTS

| | | | |
|---|---|---|---|
| 8,977,314 B2* | 3/2015 | Li | H04W 52/52 |
| | | | 375/345 |
| 2006/0222118 A1 | 10/2006 | Murthy et al. | |
| 2009/0258625 A1* | 10/2009 | Ling | H04B 17/318 |
| | | | 455/234.1 |
| 2012/0106380 A1 | 5/2012 | Vaidyanathan et al. | |
| 2013/0170374 A1 | 7/2013 | Aljadeff | |
| 2013/0223261 A1 | 8/2013 | Aggarwal et al. | |
| 2013/0301908 A1 | 11/2013 | Shim et al. | |
| 2014/0110574 A1 | 4/2014 | Ugarov | |
| 2014/0126394 A1 | 5/2014 | Stephens et al. | |
| 2014/0185520 A1 | 7/2014 | Gao et al. | |
| 2014/0293892 A1* | 10/2014 | Tsai | H04B 17/318 |
| | | | 370/329 |
| 2015/0133147 A1 | 5/2015 | Prechner | |

OTHER PUBLICATIONS

Davies, JJ et al, "Use of RSSI and Time-of-Flight Wireless Signal Characteristics for Location Tracking", May 25-27, 2011, 7 Pgs.

International Searching Authority, the International Search Report and the Written Opinion, dated Feb. 12, 2016, PCT/US2015/031110, 9 Pgs.

Luo, Q et al, "Uncertain Data Clustering-Based Distance Estimation in Wireless Sensor Networks", Apr. 9, 2014, 22 Pgs.

* cited by examiner

CORRECTING TIME-OF-FLIGHT MEASUREMENTS

BACKGROUND

Location determination systems can estimate a location of a device using various techniques. For example, some location determination systems use time-of-flight measurements of WiFi-capable devices to estimate a distance of a device from a wireless access point. If there are time-of-flight measurements available from multiple access points, a technique such as multilateration may be used to estimate the location of the device. Time-of-flight-based location determination systems have the advantage of being able to determine the location of a device in an indoor environment, where GPS signals may be blocked, for example. Improving the accuracy of location determination systems may be advantageous to provide more actionable data, such as for targeted advertisements in a retail store or mall.

BRIEF DESCRIPTION OF DRAWINGS

The following detailed description refers to the drawings, wherein.

DETAILED DESCRIPTION

To improve the accuracy of a time-of-flight-based location determination system, it is helpful to have accurate time-of-flight measurements. As used herein, time-of-flight is the round trip propagation time of signals transmitted between a wireless access point and a client device. For wireless local area networks (WLANs) based on IEEE 802.11, time-of-flight measurements are usually based on echo techniques. These techniques employ a data packet-acknowledgement packet exchange between the access point and the client, relying on the extraction of timestamps from the main WLAN clock in the access point. The time-of-departure of a data packet from the access point is measured, and the time-of-arrival of an acknowledgement packet from the client is measured. Using the time-of-departure and time-of-arrival, the Time-of-flight can then be calculated.

Access points decode signals over a large range of signal strengths that may vary widely, such as from 0 to 70 dB above the background noise level. In each access point, the WLAN chipset normalizes the received signals into a fixed range. Whenever the incoming signal is in a preferred range, the signal is already in the appropriate range and can be decoded immediately. But when the incoming signal is not within the preferred range (e.g., it is higher or lower than the preferred range), the gain control of the automatic gain control (AGC) function of the chipset is tuned so that the signal falls into the preferred range. This tuning of the gain control takes a period of time (e.g., a number of clock cycles). Because the AGC processing occurs before measuring the time-of-arrival, the measured time-of-arrival is higher than the actual time-of-arrival by the number of clock cycles required for the AGC processing, and thus the resulting time-of-flight is inaccurate. Furthermore, signal strength is just one criteria upon which it is decided to apply AGC processing, making it difficult to easily determine whether AGC processing has been applied to any given signal. Thus, from the point of view of a location determination system receiving a series of time-of-flight measurements, it may not be evident whether AGC processing altered any of the time-of-flight measurements.

In an example, a method is provided to correct time-of-flight measurements. The method includes receiving a plurality of time-of-flight measurements and determining whether the time-of-flight measurements relate to a strong signal client, a weak signal client, or a preferred signal client. If the time-of-flight measurements relate to a strong signal client or a weak signal client, it may be determined whether the time-of-flight measurements constitute two distinct distributions. If the time-of-flight measurements constitute two distinct distributions, a mean value for each distribution may be determined. If the mean values differ by a predetermined time delay attributable to automatic gain control processing, the time-of-flight measurements corresponding to the distribution having the lower mean value may be used by the location determination system to aid in determining the location of the client. The time-of-flight measurements corresponding to the distribution having the higher mean value may be discarded (e.g., not be used by the location determination system to aid in determining the location of the client). By discarding time-of-flight measurements that were affected by AGC processing, the accuracy of the location determination system may be improved. Additional examples, advantages, features, modifications and the like are described below with reference to the drawings.

Figure 1A:
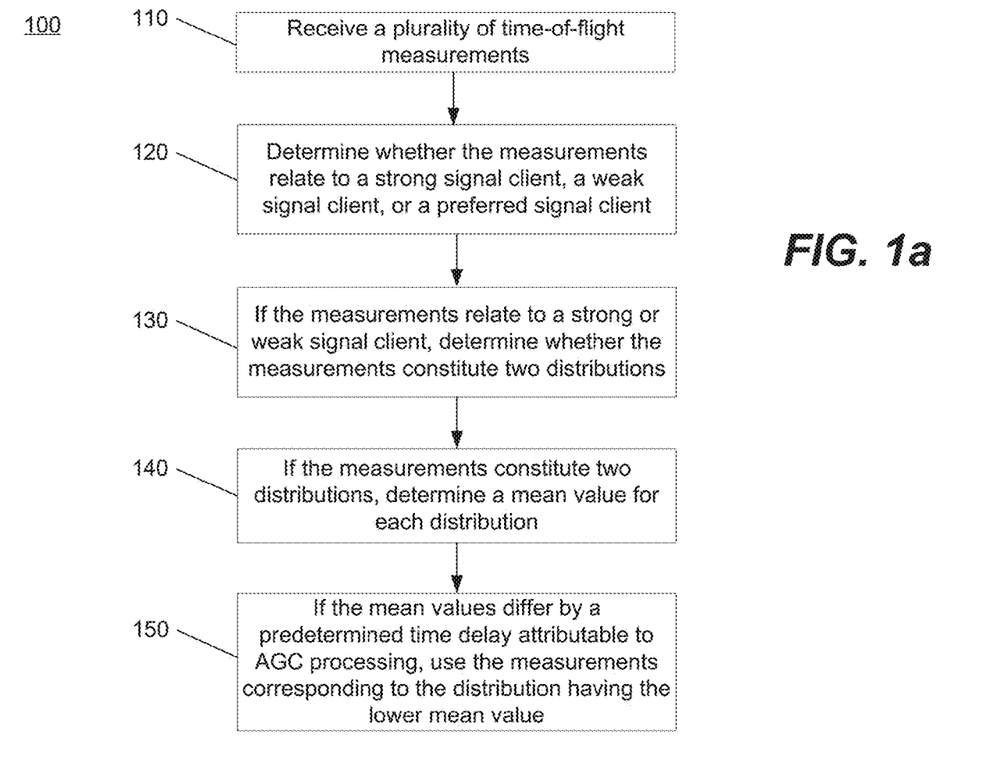
FIGS. 1a and 1b illustrate methods to correct time-of-flight measurements, according to an example.
Figure 1B:
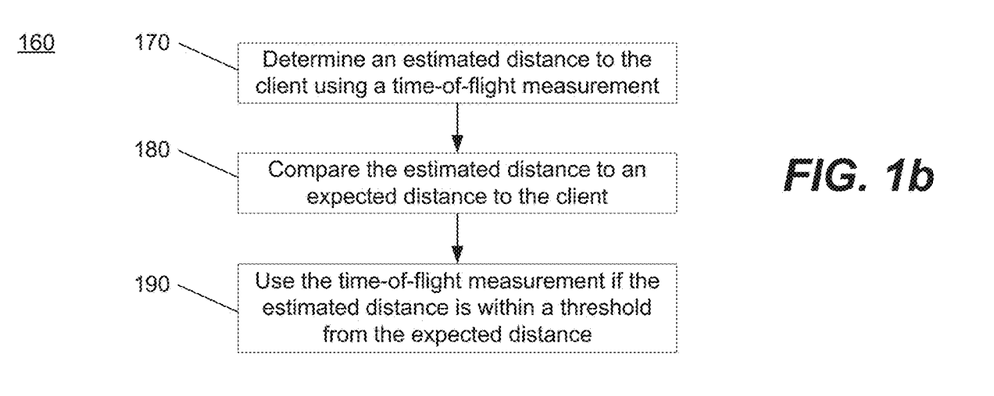

FIGS. 1a and 1b illustrate methods to correct time-of-flight (ToF) measurements, according to an example. Method 100 may be performed by a computing device or computer, such as controller system 210, and computer 310. Computer-readable instructions for implementing method 100 may be stored on a computer readable storage medium. These instructions as stored on the medium are referred to herein as "modules" and may be executed by a computer.

Figure 2:
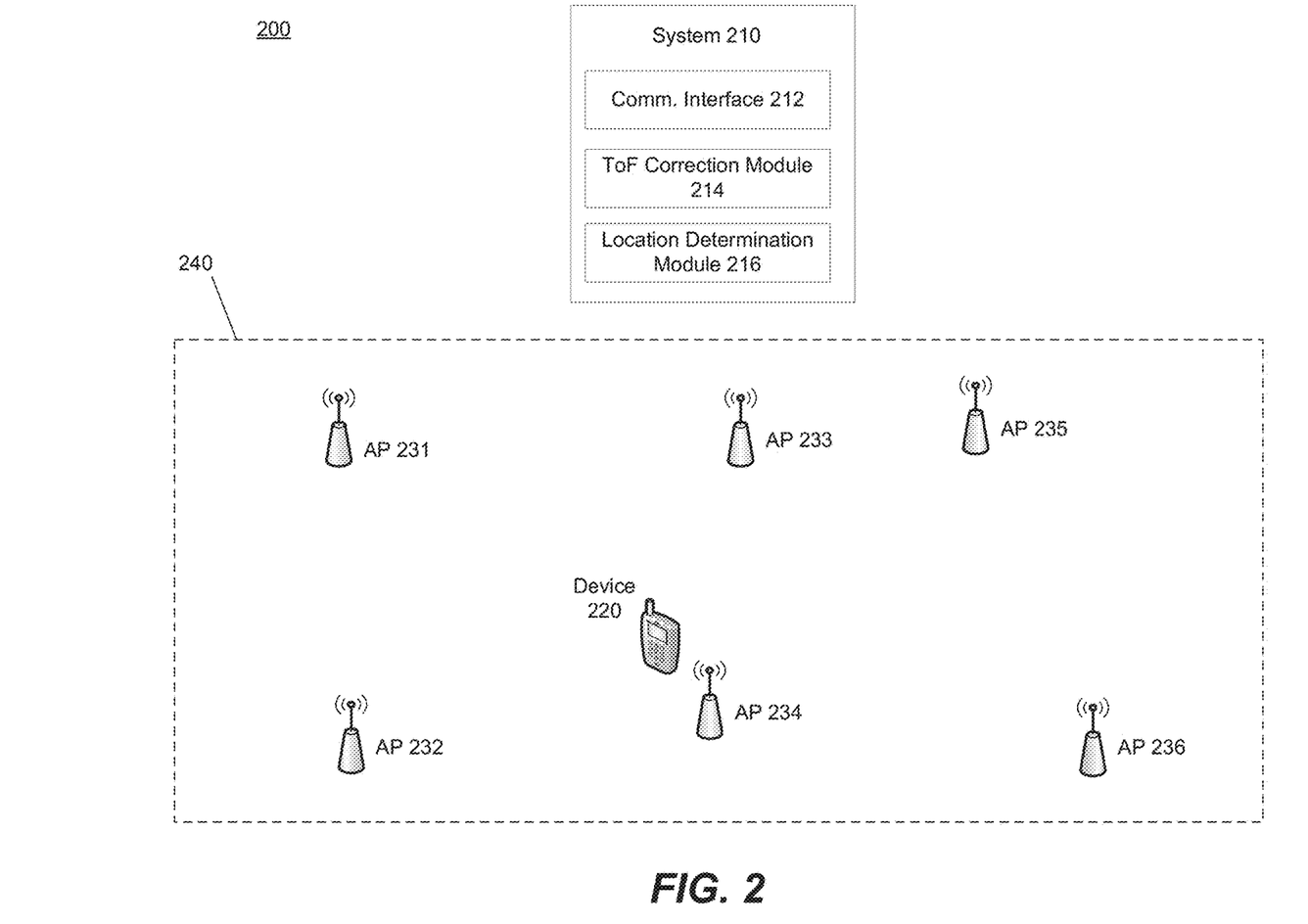
FIG. 2 illustrates a system to correct time-of-flight measurements, according to an example.

Method 100 will be described here relative to environment 200 of FIG. 2. Environment 200 may include a system 210, a device 220, and various access points (APs) 231-236. The access points may be located within an area 240, which may be an indoor area, such as a store, mall, office, etc., or an outdoor area, such as a park, city block, etc. Device 220 may be a mobile device, such as a mobile phone, smartphone, tablet computer, laptop computer, or the like, and may include wireless access capability, such as through a wireless card. System 210 may be a location determination system and may be implemented by any number of device, computers, or the like. System 210 may include a communication interface 212 for communicating with APs 231-236, a ToF correction module 214, and a location determination module 216. System 210 may be configured to perform methods 100 and 160, or aspects thereof, and/or instructions 332-336 of FIG. 3. APs 231-236 may be wireless access points that provide wireless network access to devices. The APs may implement known wireless networking protocols, such as IEEE 802.11 variations.

System 210, device 220, and APs 231-236 may include one or more controllers and one or more machine-readable storage media. A controller may include a processor and a memory for implementing machine readable instructions. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions. As an alternative or in addition to retrieving and executing instructions, the processor may include at least one integrated circuit (IC), other control logic, other electronic circuits, or combinations thereof that include a number of electronic components for performing various tasks or functions.

The controller may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM). Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory. Additionally, system 210, device 220, and APs 231-236 may include one or more machine-readable storage media separate from the one or more controllers.

Turning to FIG. 1, method 100 may be used to correct ToF measurements, according to an example. For illustration, method 100 will be described as executed by system 210. A brief overview of ToF and multilateration will now be provided before describing method 100.

In general, ToF of a wireless packet is the time which it takes for a wireless packet to travel for a given distance. A WiFi-based positioning system can use ToF between a mobile device and an access point (AP) to estimate a distance between the device and the AP. When a positioning system has estimated distances between a device and at least three APs, the system can decide a coordinate (x,y) of the device by a multilateration technique. For example, using ToF measurements from APs 231, 232, and 233, an estimated location of device 220 could be determined using multilateration. To gather ToF measurements, each AP transmits a probe packet (e.g., implemented by a WiFi-compliant (i.e., 802.11) NULL packet) to a mobile device. In response to the probe packet, device 220 sends back an acknowledgement (ACK) packet to the AP within SIFS (Short Interframe Space). SIFS is defined in the WiFi standard. The AP records when it transmits the probe packet—the time-of-departure (ToD)—and when it receives the corresponding ACK packet—the time-of-arrival (ToA). With these measurements, ToF can be calculated as follows:

$$ToF=(ToA-ToD-SIFS)/2. \quad (Eq. 1)$$

Each AP sends its ToF measurement to system 210. When system 210 receives a ToF measurement from an AP, it estimates a distance between the device and the AP as follows:

$$d_n=(ToF-baseToF)*c, \quad (Eq. 2)$$

where $d_n$ is a distance between a device and $AP_n$, baseToF represents the ToF when a device is very close to an AP and essentially corresponds to the delay in packet reception, processing, and transmission caused by the device's chipset, and c is a constant representing the speed of light. After system 210 calculates distances between the device and multiple APs, it calculates coordinates (<Lx,Ly>) of the device by a multilateration technique.

Multilateration is briefly explained here. If it is assumed that each estimated distance $d_n$ has no error, the following equation for determining distance from an AP holds for each $AP_n$:

$$d_n=\|<AP_{n,x},AP_{n,y}>-<L_x,L_y>\| \quad (Eq. 3)$$

where $AP_{n,x}$ and $AP_{n,y}$ are x and y coordinates of $AP_n$ and $\|.\|$ is the distance between two coordinates. With ToF measurements and location coordinates from three APs, a 2D coordinate $<L_x,L_y>$ may be obtained by solving a system of linear equations, where the system includes the equation above for each of the three APs. However, since the estimated distance is known to have some error due to noise in the ToF measurement, these equations do not hold. Thus, instead of solving a system of linear equations, a multilateration technique can be used to obtain an estimated location $<EL_x, EL_y>$ such that the sum of $\| \|<AP_{n,x},AP_{n,y}>-<EL_x,EL_y>\|-d_n\|$ is minimized. One example of such an estimation technique is the Gauss-Newton algorithm.

As discussed previously, for a location determination system (e.g., system 210) to generate an accurate estimation of a distance between a device and an AP, an accurate ToF measurement should be used. However, access points decode signals over a large range of signal strengths that may vary widely, such as from 0 to 70 dB above the background noise level. In each access point, the WLAN chipset normalizes the received signals into a fixed range. Whenever the incoming signal is in a preferred range, the signal is already in the appropriate range and can be decoded immediately. But when the incoming signal is not within the preferred range (e.g., it is higher or lower than the preferred range), the gain control of the automatic gain control (AGC) function of the chipset is tuned so that the signal falls into the preferred range. This tuning of the gain control takes a period of time (e.g., a number of clock cycles). Because the AGC processing occurs before measuring the ToA, the measured ToA is higher than the actual ToA by the number of clock cycles required for the AGC processing, and thus the resulting ToF is inaccurate. Furthermore, signal strength is just one criteria upon which it is decided to apply AGC processing, making it difficult to easily determine whether AGC processing has been applied to any given signal. Thus, from the point of view of a location determination system receiving a series of ToF measurements, it may not be evident whether AGC processing altered any of the ToF measurements. This can make it challenging to determine which ToF measurements are more accurate.

Method 100 may begin at 110, where system 210 may receive a plurality of ToF measurements. The ToF measurements may be received from a wireless access point, such as any of APs 231-236. The ToF measurements may be independent measurements of the ToF between the AP and client device 220, and may be measured according to the techniques explained above. Multiple ToF measurements are received to increase the accuracy of a location determination based on the ToF measurements, since any single ToF measurement may be inaccurate for some reason. Thus, by using multiple ToF measurements over a given time period, the likelihood that the aggregated ToF measurement is representative of an actual ToF between the AP and client device 220 is increased. System 210 may receive the ToF measurements from the AP via communication interface 212. In some examples, the ToF measurements may be received from a WLAN controller that manages one or more of APs 231-236.

At 120, system 210 (e.g., ToF correction module 214) may determine whether the ToF measurements relate to a preferred signal client, a strong signal client, or a weak signal client. Whenever the incoming signal is in a preferred range, the signal is already in the appropriate range of reception for the AP's chipset and so can be decoded immediately. Thus, for example, if all of the ToF measurements correspond to packets with a signal strength (e.g., RSSI) within the preferred range, then the client can be classified as a preferred signal client. Alternatively, if a mean value of signal strengths associated with packets received from the client are within the preferred range, the client can be classified as a preferred signal client. As an example of a preferred range, for one chipset the preferred range has been determined to be 16-40 dB. In such a case, processing under method 100 may cease, and the ToF measurements may be used for location determination of client device 220, such as by location determination module 216 of system 210.

When instead the signal is out of the preferred range, the gain control of the AGC is tuned so that the signal falls into the desired range. In particular, strong signal detection by an AP may occur when the signal is received at a high strength that exceeds a certain threshold. Upon detection of this condition, the chipset places the radio frequency front-end in a low gain mode and decreases the amplifier's gain to avoid Analog-to-Digital (ADC) saturation, which is a condition when an input signal is outside the range (i.e., above or below the range) of the ADC resulting in the ADC producing maximum or minimum values (maximum values if the signal is above the range, minimum values if the signal is below the range) in response to the input signal. Similarly, weak signal detection by an AP may occur when the signal is received at a low strength that falls below a certain threshold. In such a case, the amplifier gain may be increased to avoid ADC saturation. In both strong signal detection and weak signal detection, the gain is held constant during the reception of the entire frame corresponding to the incoming signal. When the reception is completed, the amplifier gain is returned back to its default value. As described previously, AGC processing cause the ToA to be higher than the actual ToA by the number of additional clock cycles the chipset took to perform the AGC processing on the incoming signal, which thus cause the ToF to be inaccurate.

If all of the ToF measurements correspond to packets with a signal strength exceeding the preferred range, the client may be classified as a strong signal client. Alternatively, if a mean value of signal strengths associated with packets received from the client exceed the preferred range, the client can be classified as a strong signal client. Similarly, if all of the ToF measurements correspond to packets with a signal strength below the preferred range, the client may be classified as a weak signal client. Alternatively, if a mean value of signal strengths associated with packets received from the client fall below the preferred range, the client can be classified as a weak signal client. However, there may exist an overlapping range of signal strength such that AGC processing may potentially be applied or may potentially not be applied. As an example for one chipset, this overlapping range was determined to be 10-16 dB and 40-48 dB. In particular, if the incoming signal had a strength between 10-16 dB, AGC processing for weak signal detection may or not be applied. Similarly, if the incoming signal had a strength between 40-48 dB, AGC processing for strong signal detection may or may not be applied. For this reason, it may not be possible to examine only the signal strength of an incoming signal to determine whether AGC processing was applied.

Figure 3:
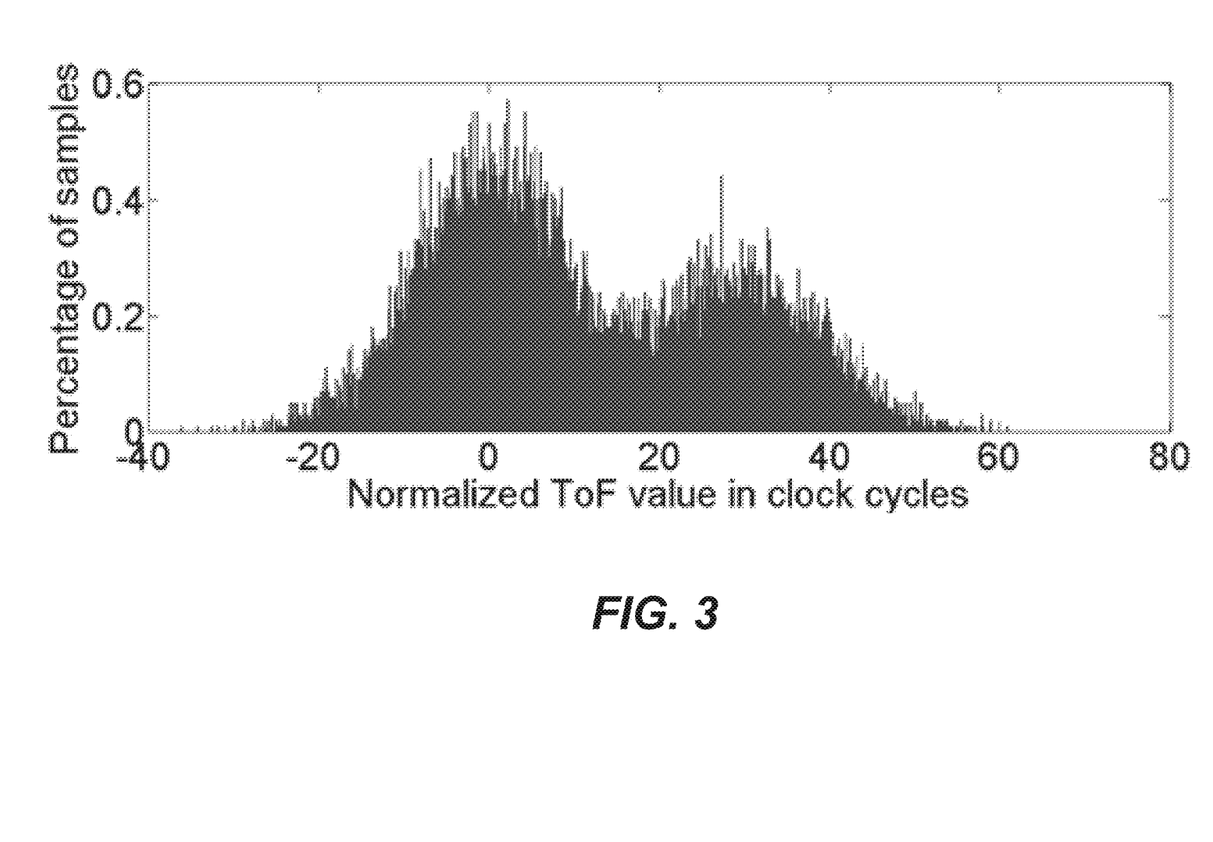
FIG. 3 depicts a distribution of time-of-flight measurements, according to an example.

At 130, if the ToF measurements are determined to relate to a strong or weak signal client, system 210 (e.g., ToF correction module 214) may determine whether the measurements constitute two distinct distributions. Because the ToF measurements collected in the weak signal detection state or strong signal detection state are different from the more accurate ToF measurements collected in the preferred range signal detection state, when multiple ToF measurements are aggregated for strong signal or weak signal clients, the ToF measurements will form two distinct distributions. In particular, the ToF values in the preferred range signal detection state will form one distribution and the ToF values in the weak signal detection state or strong signal detection state will form the second distribution (due to having the increased number of clock cycles due to AGC processing). FIG. 3 illustrates such a case. As can be seen, the normalized ToF values form two distributions, each with its own peak. The distribution with fewer clock cycles corresponds to the preferred range signal detection state, and thus represents a more accurate measurement of ToF.

At 140, if the measurements constitute two distinct distributions, system 210 (e.g., ToF correction module 214) may determine a mean value for each distribution. For blocks 130 and 140, system 210 (e.g., ToF correction module 214) may determine whether there are two distributions by using a clustering technique, such as k-means clustering. The k-means clustering technique can be used to attempt to cluster the ToF measurements into two different distributions, which if successful will thereafter report the mean values of the two different clusters.

At 150, system 210 (e.g., ToF correction module 214) may determine whether the mean values differ by a predetermined time delay attributable to AGC processing. If they do, the ToF measurements corresponding to the distribution having the lower mean value may be used. The predetermined time delay attributable to AGC processing may vary between access point wireless chipsets. As one example, for one chipset the time delay attributable to AGC processing has been found to be 30 clock cycles (as measured by the WLAN clock of the access point). The time delay attributable to AGC processing may be determined for a given chipset by consulting documentation for the chipset or through experimentation. In the case where different chipsets are used for different access points providing ToF measurements to system 210, a table may be stored listing the time delay attributable to AGC processing for each access point. This table may then be consulted by ToF correction module 214. When determining whether the mean values differ by the time delay attributable to AGC processing, some variance from the precise time delay may be permissible. For example, if the time delay is 30 clock cycles, a variance of +−5 clock cycles may be permissible. The ToF measurements corresponding to the distribution with the lower mean value may be selected for use by location determination module 216 because it is those ToF measurements that are more accurate since they do not have the extra clock cycles added to the ToF measurement.

If the mean values of the two distributions do not differ by the time delay attributable to AGC processing, several options are available for action. For example, in one implementation all of the ToF measurements may then be discarded. This may be the preferred option if the mean values of the two distributions differ by significantly more than the time delay attributable to AGC processing, as the ToF measurements may be deemed unreliable since there is no clear explanation as to why they differ so widely. As another example, all of the ToF measurements may be used (i.e., none are discarded) for location determination of the client device 220. In a further implementation, method 160 may be performed to assess the accuracy of each ToF measurement. Method 160 may also be performed in the case where two distributions were not identified in block 140 of method 100. Method 160 will now be described.

Method 160 may be performed for each ToF measurement of the plurality of ToF measurements, to determine the accuracy of each individual ToF measurement. At 170, system 210 may determine an estimated distance to the client device 220 from the wireless access point (that provided the plurality of ToF measurements) using the time-of-flight measurement. The techniques described earlier may be used to estimate the distance using the ToF measurement. At 180, system 210 may compare the estimated distance to an expected distance to the client device 220 from the wireless access point. The expected distance may be determined based on an estimated location of the client device 220 that has already been determined by system 210. For example, system 210 may have accurate ToF measurements from other APs within area 240 that location determination module 216 may use to estimate the location of client device 220, and thus estimate a distance between the current AP and the client device 220. This distance may be the expected distance that is compared to the estimated distance from block 170. At 180, system 210 may select the time-of-flight measurement for use in location determination if the estimated distance is within a threshold from the expected distance. The threshold may be configured based on the desired accuracy. For example, one threshold may be 10 meters, such that if the estimated distance is within 10 meters from the expected distance, the ToF measurement is considered to be accurate enough for use in location determination. ToF measurements that yield estimated distances outside the threshold may be discarded and not used for location determination.

Figure 4:
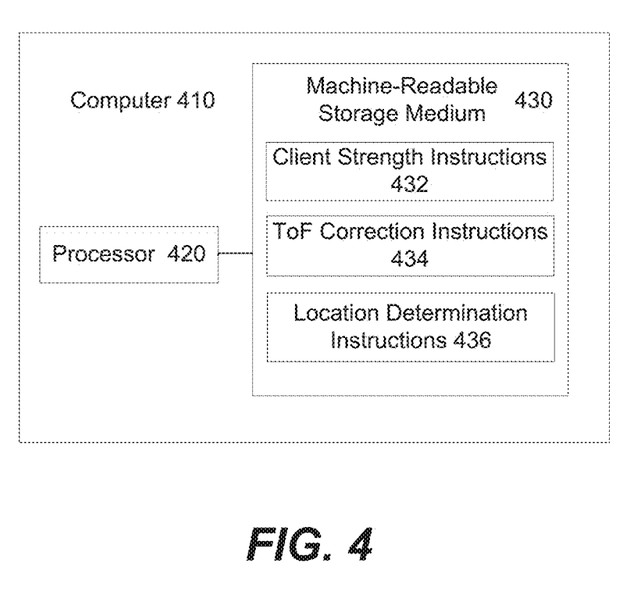
FIG. 4 illustrates a computer-readable medium to correct time-of-flight measurements, according to an example.

FIG. 4 illustrates a computer-readable medium to determine a location of a device, according to an example. Computer 410 may be part of system 210. The computer may include one or more controllers and one or more machine-readable storage media, as described with respect to system 210, for example.

Processor 420 may be at least one central processing unit (CPU), at least one semiconductor-based microprocessor, other hardware devices or processing elements suitable to retrieve and execute instructions stored in machine-readable storage medium 430, or combinations thereof. Processor 420 can include single or multiple cores on a chip, multiple cores across multiple chips, multiple cores across multiple devices, or combinations thereof. Processor 420 may fetch, decode, and execute instructions 432-436 among others, to implement various processing. As an alternative or in addition to retrieving and executing instructions, processor 420 may include at least one integrated circuit (IC), other control logic, other electronic circuits, or combinations thereof that include a number of electronic components for performing the functionality of instructions 432-436. Accordingly, processor 420 may be implemented across multiple processing units and instructions 432-436 may be implemented by different processing units in different areas of computer 410.

Machine-readable storage medium 430 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 430 can be computer-readable and non-transitory. Machine-readable storage medium 430 may be encoded with a series of executable instructions for managing processing elements.

The instructions 432-436 when executed by processor 420 (e.g., via one processing element or multiple processing elements of the processor) can cause processor 420 to perform processes, for example, methods 100, 160, and/or variations and portions thereof. Instructions 432-436 will now be briefly described, which description should be read in light of the description of methods 100, 160, and system 210 above.

For example, client strength instructions 432 may cause processor 420 to determine that a plurality of ToF measurements correspond to a strong signal client or a weak signal client. ToF correction instructions 434 may cause processor 420 to determine that the ToF measurements belong to two distinct distributions and determine whether a mean value of one of the distributions differs from a mean value of the other distribution by a predetermined time delay attributable to automatic gain control processing. If determined that the mean values differ by approximately the predetermined time delay attributable to automatic gain control processing, the ToF measurements corresponding to the distribution with the lower mean value may be used to assist in estimating a location of the client. In particular, location determination instructions 436 may cause processor 420 to use the selected ToF measurements to perform location determination.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method for correcting time-of-flight measurements, comprising, by a processor:
   receiving a plurality of time-of-flight measurements;
   determining whether the time-of-flight measurements relate to a strong signal client, a weak signal client, or a preferred signal client;
   if the time-of-flight measurements relate to a strong signal client or a weak signal client, determine whether the time-of-flight measurements constitute two distinct distributions; and
   if the time-of-flight measurements constitute two distinct distributions,
      determine a mean value for each distribution;
      if the mean values differ by a predetermined time delay attributable to automatic gain control processing, use the time-of-flight measurements corresponding to the distribution having the lower mean value.

2. The method of claim 1, wherein determining whether the time-of-flight measurements constitute two distinct distributions is performed using a k-means clustering technique.

3. The method of claim 1, wherein determining whether the time-of-flight measurements relate to a strong signal client, a weak signal client, or a preferred signal client comprises:
    if a mean value of signal strengths associated with packets received from the client is greater than 40 dB, determining that the time-of-flight measurements relate to a strong signal client;
    if a mean value of signal strengths associated with packets received from the client is less than 16 dB, determining that the time-of-flight measurements relate to a weak signal client; and
    if a mean value of signal strengths associated with packets received from the client is greater than or equal to 16 dB and is less than or equal to 40 dB, determining that the time-of-flight measurements relate to a preferred signal client.

4. The method of claim 1, if the mean values differ by more than or less than the predetermined time delay attributable to automatic gain control processing, discard the time-of-flight measurements.

5. The method of claim 1, wherein the processor is part of a location determination system.

6. The method of claim 5, wherein the time-of-flight measurements are measured by a wireless access point.

7. The method of claim 6, comprising:
    if the time-of-flight measurements do not constitute two distinct distributions, for each time-of-flight measurement:
    determine an estimated distance to the client from the wireless access point using the time-of-flight measurement;
    compare the estimated distance to an expected distance to the client from the wireless access point; and
    use the time-of-flight measurement if the estimated distance is within a threshold from the expected distance,
    wherein the expected distance is determined based on an estimated location of the client determined by the location determination system.

8. The method of claim 7, wherein the threshold is 10 meters.

9. The method of claim 1, wherein the predetermined time delay attributable to automatic gain control processing is 30 clock cycles.

10. A location determination system, comprising:
    a communication interface to receive from a wireless access point multiple time-of-flight measurements associated with a client; and
    a time-of-flight correction module to:
    determine if the time-of-flight measurements need correction; and
    if determined that the time-of-flight measurements need correction, determine which time-of-flight measurements to discard based on the use of automatic gain control by:
    determining that the time-of-flight measurements are from two distinct distributions; and
    selecting the time-of-flight measurements corresponding to the distribution with the lower mean value.

11. The location determination system of claim 10, wherein the time-of-flight correction module is to determine if the time-of-flight measurements need correction by determining whether the client is a strong signal client, a weak signal client, or a preferred signal client based on the mean value of the time-of-flight measurements.

12. The location determination system of claim 10, wherein using the time-of-flight measurements corresponding to the distribution with the lower mean value further comprises:
    selecting the time-of-flight measurements corresponding to the distribution with the lower mean value only if the two distributions differ by approximately a predetermined time delay attributable to automatic gain control processing.

13. The location determination system of claim 10, further comprising:
    a location determination module to determine a location of the client using the selected time-of-flight measurements.

14. The location determination system of claim 13, wherein the time-of-flight correction module is to:
    if determined that the time-of-flight measurements are not from two distinct distributions, for each time-of-flight measurement;
    determine an estimated distance to the client from the wireless access point using the time-of-flight measurement;
    compare the estimated distance to an expected distance to the client from the wireless access point; and
    use the time-of-flight measurement if the estimated distance is within a threshold from the expected distance,
    wherein the expected distance is determined based on an estimated location of the client determined by the location determination module using prior time-of-flight measurements.

15. A non-transitory computer-readable storage medium storing instructions for correcting time-of-flight that, when executed by a processor, cause the processor to:
    determine that a plurality of time-of-flight measurements correspond to a strong signal client or a weak signal client;
    determine that the time-of-flight measurements belong to two distinct distributions;
    determine whether a mean value of one of the distributions differs from a mean value of the other distribution by a predetermined time delay attributable to automatic gain control processing; and
    if determined that the mean values differ by approximately the predetermined time delay attributable to automatic gain control processing, use the time-of-flight measurements corresponding to the distribution with the lower mean value to assist in estimating a location of the client.

* * * * *